3,132,262
REVERSIBLE COUNTER
John Kaufmann, Sunnyvale, Calif., assignor to General Precision, Inc., Binghamton, N.Y., a corporation of Delaware
Filed Dec. 4, 1961, Ser. No. 156,795
9 Claims. (Cl. 307—88.5)

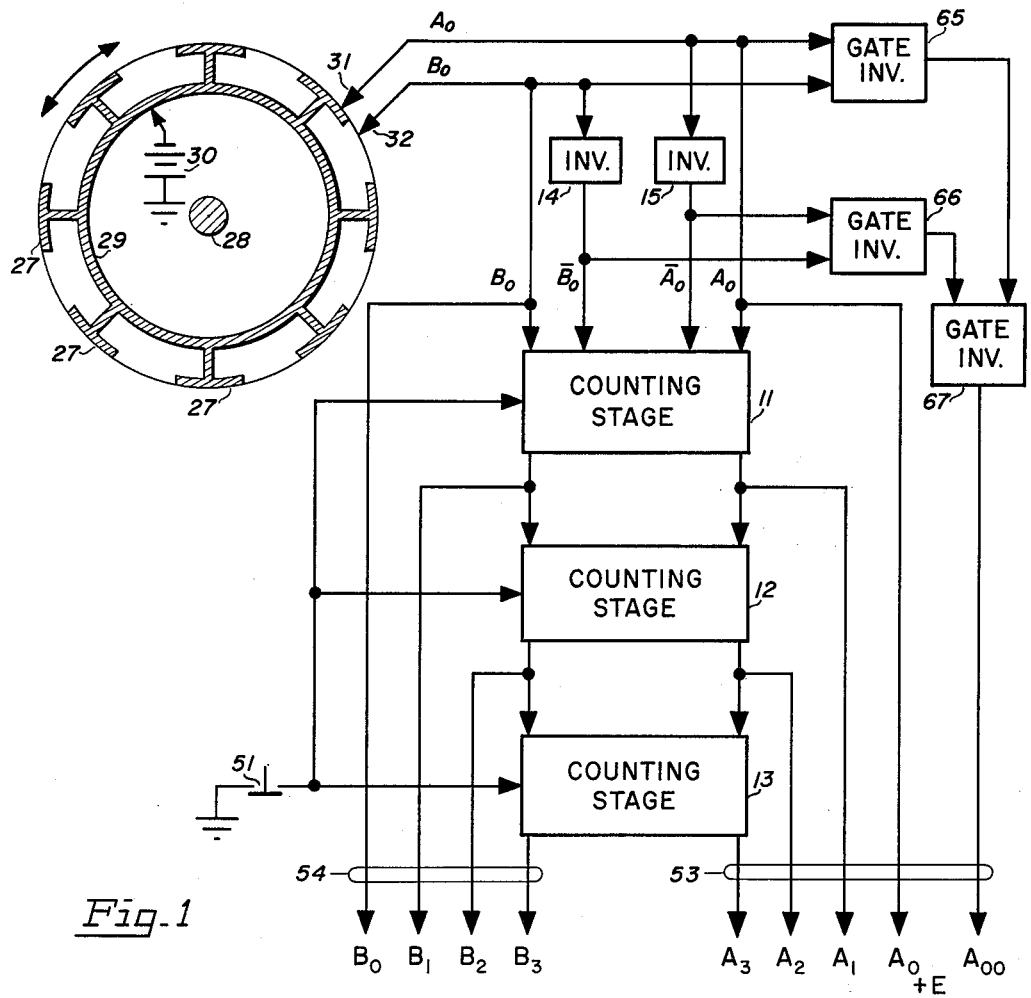
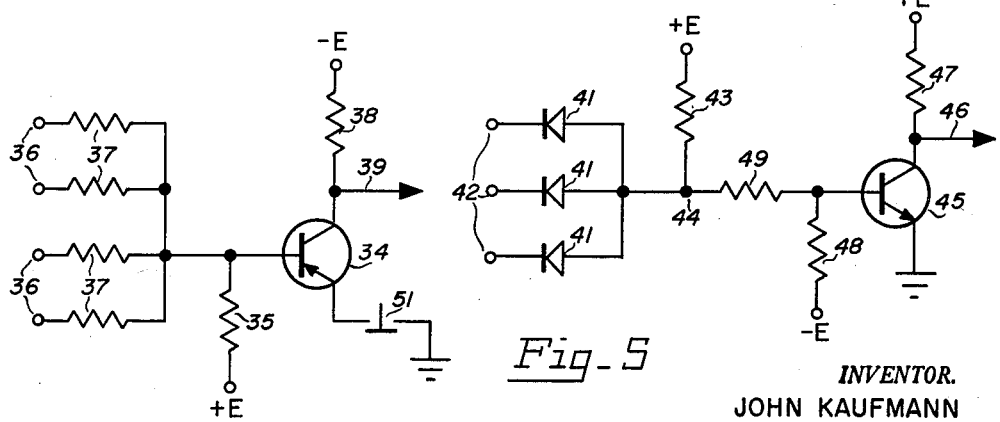
Fig. 1
Fig. 4   Fig. 5
INVENTOR.
JOHN KAUFMANN
BY
Edward A. Robinson
ATTORNEY United States Patent Office 3,132,262
Patented May 5, 1964

This invention relates to counting circuits and more particularly, to a circuit for reversibly counting signals which may occur at varying rates in either a direct sequence or a reversed sequence such that the circuit must count up and count down to produce an output signal indicative of a net measurement.

The counting circuit of this invention may be useful in a device such as an interferometer optical system for making precise and absolute measurements as described in a Patent No. 2,977,841, granted to John Kaufmann and Woodrow I. Hayes on April 4, 1961. In this device, an article to be measured may be placed upon the supporting surface of an anvil and a movable head may close down upon the article. The measurement is accomplished by counting optical spectral lines by a light sensitive means as the measuring head moves upwardly from a contact position with the anvil surface to allow the article to be placed thereon, and thence moves downwardly upon the article. As the measuring head moves upwardly from the anvil, direct or forward electrical signals from the light sensitive means are counted by the counter, thence as the measuring head moves downwardly to close upon the article, reversed or backward signals are counted in reverse by the counter such that the final position of the measuring head will be indicated by the final output indication of the counter.

The signals to be counted comprise a pair of waves which are in quadrature phase relationship with each other such that the leading wave is substantially 90° ahead in phase of the lagging wave. These waves are converted into square waves by trigger or flip-flop circuits or any other suitable means, and the square waves generated will have the quadrature phase relationship with respect to each other. From the foregoing, it will be appreciated that the square waves to be counted need not have a definite frequency of recurrence. Indeed, the interferometer system generates square waves in pairs which may occur at a rate of 100 kilocycles as the measuring head is moving upwardly or downwardly, but which will come to a complete standstill when the measuring head likewise comes to a standstill.

Heretofore, reversible counters have been devised using logical switching networks that supply "up" or "down" pulses which are used to drive conventional counters. The use of a logical switching network at the input stage of a counter for supplying up-down pulses ordinarily necessitates a limit of the rate of recurrence of the up-down pulses, and particularly, the rate must be limited when the input signals tend to jitter about a transition point. Thus, for example, if a binary counting system were to count to a value such as 011111 (the binary equivalent of the decimal number 31), and then the input were to alternately provide pulses for counting up and down at a rapid rate, all of the binary digits of the count would become unstable since the counter is in an indefinite region between 011111 and 100000 (the binary equivalent of the decimal numbers 31 and 32). This disadvantage of the logical switching network is substantially eliminated by providing a region of uncertainty which must be fully traversed in each direction in order to produce the appropriate "up" pulse or "down" pulse. This region of uncertainty is equivalent to hysteresis and is undesirable in certain applications of a counter such as the interferometer optical measuring device of the Patent 2,977,841, supra.

It is an object of this invention to provide an improved circuit which will count reversibly each cycle of a pair of signals shifted in phase with each other and which may occur at rates ranging from the steady state (zero) to very high rates in the order of 100 megacycles.

Another object of this invention is to provide an improved circuit for reversibly counting having no ambiguity, or "backlash" between counting stages such that signals may be counted without any restriction as to the time or manner of reversal of the input signals.

Another object of this invention is to provide an improved counter having several stages wherein high speed components may be used in a first stage corresponding to the least significant bit or digits and wherein further stages for counting bits or digits of the more significant orders may be constructed of less expensive components which may have lower response rates.

Numerous other objects and advantages will be apparent throughout the progress of the specification which follows. The accompanying drawings illustrate a certain selected embodiment of the invention and the views therein are as follows:

FIGURE 1 is a circuit diagram of the reversible counter of this invention;

FIGURE 4 is a circuit diagram of one type of inverter gate circuit commonly referred to as a NOR circuit which may be used in the circuits of FIGURES 1 and 2 as illustrated by the block symbols therein; and FIGURES 5 is a diagram of another type of inverter gate circuit commonly known as an NAND circuit which may also be used in the circuits of FIGURES 1 and 2 as indicated by the blocks therein.

Figure 2:
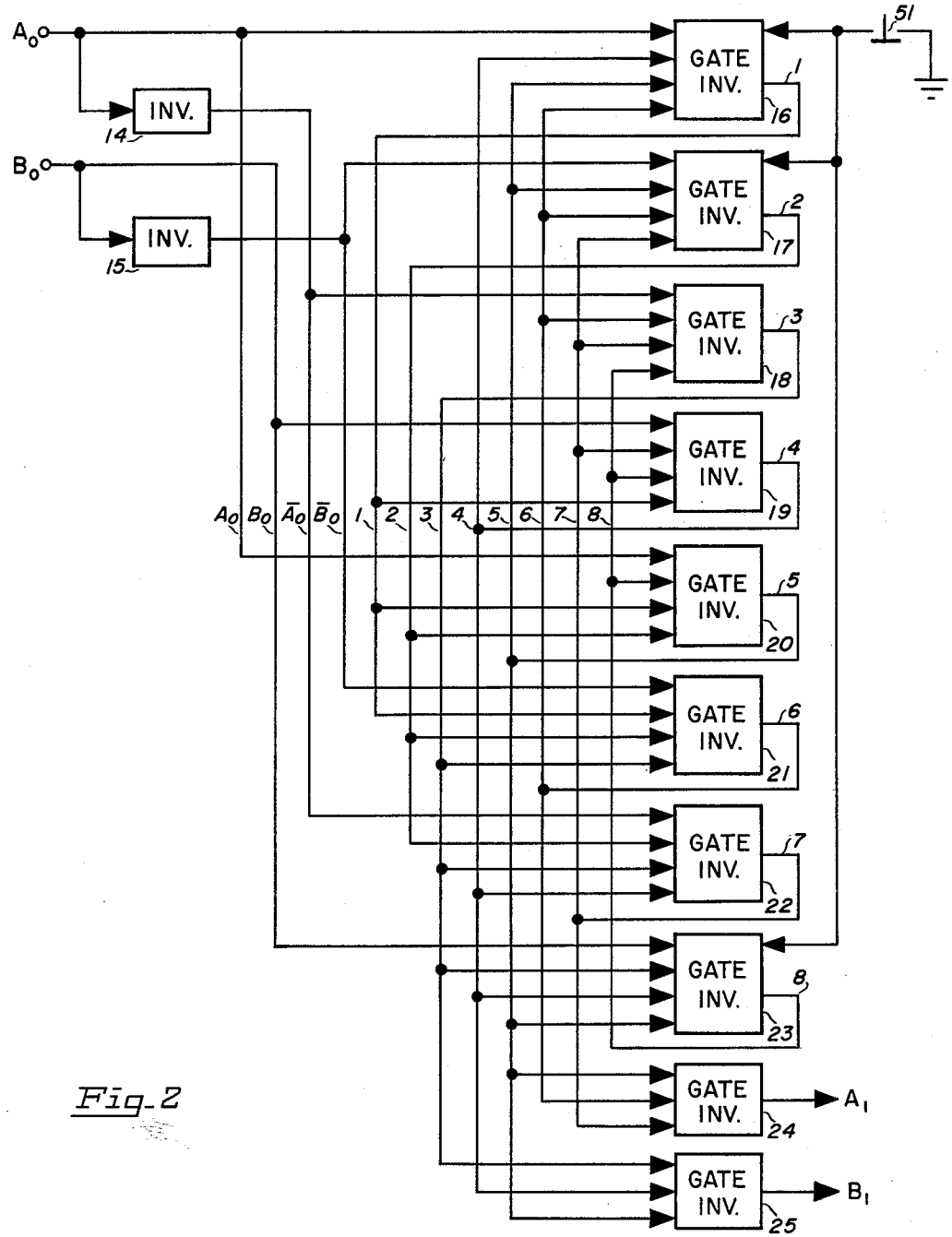
FIGURE 2 is a diagram of the circuit of each of the counting stages illustrated by blocks in FIGURE 1.
Figure 3:
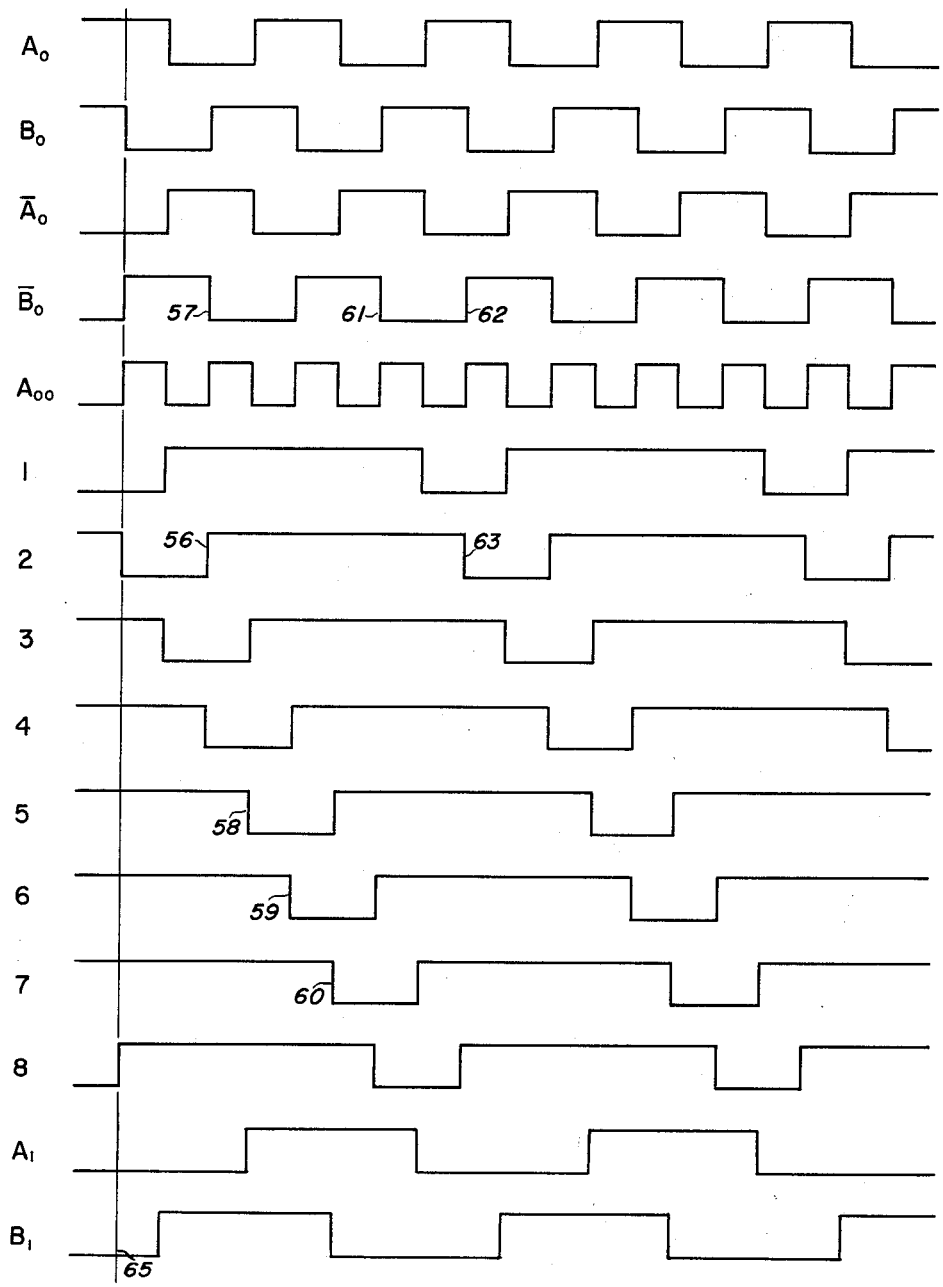
FIGURE 3 is a graphical representation of the signals occurring in the circuits of FIGURES 1 and 2 and specifically illustrate the timing of said signals.

Briefly stated, according to this invention, a reversible counter may include several counting stages 11, 12 and 13 coupled in tandem such that output signals from each stage constitute input signals to the next succeeding stage. Input signals supplied to the first counting stage 11 are square waves $A_0$ and $B_0$ which are in quadrature phase relation with each other, and the output signals from each counting stage 11, 12 and 13 are likewise pairs of square waves in quadrature with each other, but having ½ of the frequency of the input waves to the respective stage. As shown in FIGURE 2, a group of gate-inverter circuits 16 through 23 are arranged in a quasi counting ring, each having four input terminals and an output terminal. A negative conditioning voltage applied to any of the input terminals will result in an output voltage of substantially ground potential, and when no conditioning voltages appear on any of the input leads, the potential of the output lead will drop to a negative reference value with respect to ground potential. One of the input leads of each of the gate-inverter circuits is coupled to receive one of the direct input wave $A_0$ or $B_0$ or one of the inverted input waves $\overline{A}_0$ or $\overline{B}_0$. The other three input leads are connected to output leads of other gate-inverter circuits 16 through 23. As shown by FIGURE 3, the output signal from each of the gate-inverter circuits 16 through 23 comprises the respective waves 1 through 8. These waves are normally at ground potential but become negative in a progressive and overlapping sequence. It may further be noted from FIGURE 3 that the output wave 1 from the gate-inverter circuit 16 follows naturally in sequence from the wave 8 of the gate-inverter circuit 23 as in a true ring counter or network and hence the combination of gate-inverter circuits 16 through 23 is a quasi ring network. Two additional gate-inverter circuits 24 and 25 constitute an output means and each have three input leads which are coupled to particular ones of the output leads of the gate-inverter circuits 16 through 23 and provide square waves $A_1$ and $B_1$ shifted in quadrature with respect to each other and ½ of the frequency of the input waves.

In FIGURE 1 the counting circuit is coupled to receive quadrature square waves from a commutator 27 which may rotate with a shaft 28 to provide an indication of rotational position. Each of the segments of the commutator 27 are shown electrically connected to a slip ring 29 which may receive a negative reference potential from a voltage source indicated as a battery 30. The conductive segments are equal in length to and interspersed with non-conductive portions of the commutator 27. Pick-up brushes indicated by arrows 31 and 32 may be spaced apart a distance equal to ½ the arcuate length of each commutator segment and gap therebetween. As indicated in FIGURE 1, the counter circuit will receive square waves $A_0$ and $B_0$ from the rotation of the commutator 27, but this representation is intended to be purely schematic and it will be appreciated that the input to the counter may be waves derived from any source and need not be associated with a commutator arrangement as shown. Indeed, the counter circuit when applied to the interferometer system of Patent No. 2,977,841, supra, counts square wave input signals which are derived in a manner totally unrelated to shaft rotation or commutation.

The circuits shown in FIGURES 1 and 2 make use of gate-inverter circuits each of which may be a NOR circuit shown by FIGURE 4 or alternatively may be a NAND circuit shown by FIGURE 5. The NOR circuit of FIGURE 4 includes a transistor 34 having an emitter electrode which is coupled to the ground reference potential, and a base electrode which is coupled to a positive reference potential by a resistor 35 and is further coupled to input terminals 36 by resistors 37. The collector electrode of the transistor 34 is coupled to a negative reference potential by a load resistor 38 and provides an output connection 39. During times when no input signals are impressed upon any of the input terminals 36, the transistor 34 is rendered non-conductive since the base electrode is biased positive with respect to the emitter electrode. With the transistor 34 cut off, the negative voltage of the reference potential, $-E$, will appear at the output terminal 39. If a negative conditioning voltage is impressed upon any one or more of the terminals 36, the biasing effect of the positive reference potential applied through the resistor 35 will be overome, and the base electrode of the transistor 34 will become negative with respect to the emitter electrode. In such case, the transistor 34 will become conductive such that the voltage drop across the transistor will be slight and the current therethrough will be limited principally by the load resistor 38 whereby the output signal appearing at the terminal 39 will be substantially at ground or zero potential.

It may be appreciated that the NOR circuit of FIGURE 4 functions as a conventional OR circuit followed by an inverter circuit. Thus, if no signal appears at any of the input terminals, the output signal will have a negative value, but if a negative signal is impressed upon any one or more of the input terminals the output signal decreases to zero.

The NAND circuit of FIGURE 5 includes a plurality of diodes 41 coupled to input terminals 42 and a resistor 43 which together constitute an AND circuit. If a positive signal is impressed upon all of the input terminals 42, a positive potential will appear at a point 44. However, if a zero voltage is impressed upon any one or more of the input terminals 42, the respective diode 41 will conduct, and the potential at the point 44 will become substantially zero. An NPN transistor 45 is coupled as an emitter follower with the emitter electrode grounded. The collector electrode of the transistor 45 is directly coupled to an output terminal 46 and is coupled to a positive reference potential by a load resistor 47. The base electrode of the transistor 45 is coupled to a negative reference potential by a resistor 48. The transistor 45 constitutes an inverter circuit since the positive reference potential will appear at the output terminal 46 when no input signal is impressed upon the base electrode, but a substantially zero potential will appear at the output terminal when a positive reference potential is impressed upon the base electrode. Thus, the circuit of FIGURE 5 constitutes a diode AND circuit coupled to a transistor inverter circuit by a resistor 49. The complete circuit of FIGURE 5 constitutes a NAND circuit, and is a gate-inverter circuit which may perform a similar function to the circuit of FIGURE 4.

Although the circuit of FIGURE 4 is logically an OR gate followed by an inverter, and the circuit of FIGURE 5 is an AND gate followed by an inverter, the two circuits are similar in their function. The operative signal levels of FIGURE 4 will vary from a negative reference potential up to the zero or ground reference potential, while the operative voltages of the circuit of FIGURE 5 will vary from the zero potential up to a positive reference potential. In each case, if positive signals are impressed on all of the input terminals, a negative output signal will appear, and if a negative input signal is impressed on any one or more of the input terminals, a positive output signal will appear. Either the NOR circuit or the NAND circuit heretofore illustrated and described may be used as the gate-inverter circuits of FIGURES 1 and 2. It may be further appreciated that the inverter circuits 14 and 15 shown in these figures may be essentially the circuit of FIGURE 4 having but a single input terminal 36 and input resistor 37.

FIGURE 4 shows a normally closed switch or push-button 51 coupled between the emitter electrode of the transistor 34 and the ground reference potential. This switch 51 may be used as a reset means for causing the transistor 34 to be cut off and to thereby pass the negative reference potential from the output terminal 39. As will be described later, certain of the gate-inverter circuits may be driven into non-conduction by the reset means 51 for resetting the entire counter. Those gate-inverter circuits to be reset, may be grounded through a common normally closed switch 51 as indicated in FIGURE 2 to reset each counting stage, and the several counting stages shown by FIGURE 1 may likewise share the common normally closed switch 51.

As shown in FIGURE 1, the various counting stages 11, 12 and 13 are coupled in tandem such that the output terminals of one stage are coupled to the input terminals of the next succeeding stage. A total readout indication for the counting system as a whole may be provided by the output terminals of each of the stages. Output terminals 53 are each coupled to "A" wave signals and will provide a readout indication in accordance with the natural binary code. A different set of output terminals 54 are each coupled to the quadrature or "B" wave signals and will provide a similar readout indication.

An understanding of the operation of each counting stage may be gained with reference to FIGURE 2, and with further reference to the timing diagram of FIGURE 3. As shown by the first two waves of FIGURE 3, the $A_0$ and $B_0$ input signals are both square waves with the wave $A_0$ lagging the wave $B_0$ by 90° phase shift when the commutator 27 (FIGURE 1) rotates counter-clockwise. The inverted waves $\overline{A}_0$ and $\overline{B}_0$ are generated by the inverter circuits 14 and 15, and together with the direct waves $A_0$ and $B_0$, provide four quadrature input waves differing from each other by 90° phase shifts.

As indicated heretofore, the gate-inverter circuits 16 through 23 are each provided with four input leads of which one receives either direct or inverted signals from the $A_0$ and $B_0$ terminals, and the remaining three input leads connect to the output leads of other gate inverter circuits. For example, the first of the gate inverter circuits 16 is coupled to receive the $A_0$ input signal together with the signals of the output leads 4, 5 and 6 which are generated respectively by the gate inverter circuits 19, 20 and 21. Since this circuit operates as an OR circuit combined with an inverter output, a negative conditioning signal applied to any of the input leads will result in a zero or ground potential from the output lead. In Boolean algebra notation we may write the equation:

(1) $\qquad \overline{1} = A_0 + 4 + 5 + 6$

In the above equation the $\overline{1}$ represents the condition of the gate-inverter circuit 16 wherein the output voltage is zero and the four terms on the right side of the equation joined by + signs indicate that any one or more of the four input voltages will cause the absence of an output voltage. Obviously, if no input signals appear on any of the four input leads, a negative voltage will be generated at the output lead 1.

From the above it may be understood that the operation of the gate-inverter circuit 16 is defined by Equation 1. Similarly, the operation of the other gate-inverter circuits 17 through 23 may be defined by further Boolean algebra equations as follows:

(2) $\qquad \overline{2} = B_0 + 5 + 6 + 7$
(3) $\qquad \overline{3} = \overline{A}_0 + 6 + 7 + 8$
(4) $\qquad \overline{4} = \overline{B}_0 + 7 + 8 + 1$
(5) $\qquad \overline{5} = A_0 + 8 + 1 + 2$
(6) $\qquad \overline{6} = B_0 + 1 + 2 + 3$
(7) $\qquad \overline{7} = \overline{A}_0 + 2 + 3 + 4$
(8) $\qquad \overline{8} = \overline{B}_0 + 3 + 4 + 5$ FIGURE 3 shows the wave forms of the various output signals from the gate-inverter circuits 16 through 23 represented by the curves 1 through 8. As indicated heretofore the output voltages of these circuits vary from zero to a negative reference value, and the negative lobes or excursions are representative of binary "1's." It is seen from these wave forms 1 through 8 that each successive gate-inverter circuit becomes conductive to produce negative output voltage in an overlapping sequence. Thus, the wave form 2, representative of the output voltage of the gate inverter circuit 17, has a negative lobe or excursion which commences during the time of the negative excursion of the preceding wave 1, and continues until after the next subsequent wave 3 has become negative. This overlapping of the sequential waves of the quasi ring circuit arrangement prevents undesirable spurious voltages from being generated due to transient effects when one circuit becomes conductive and another circuit becomes non-conductive simultaneously. Thus, it may be appreciated that each of the gate-inverter circuits 16 through 23 is coupled to a set of three overlapping output voltages (overlapping in time sequence), and therefore, the three input waves combine to provide continuity even though certain ones of the input waves may be switched on and off. The three waves derived from the output signals from other gate-inverter circuits effectively bridge a gap between two successive alternate half cycles of the direct input waves $A_0$ and $B_0$ or the inverted input waves $\overline{A}_0$ and $\overline{B}_0$.

For example, the output wave of the gate-inverter circuit 17 must be in a zero state during the times when any of the waves $\overline{B}_0$, 5, 6 or 7 are in a state of negative voltage (see Equation 2 above). If we examine the curve of the wave 2, (FIGURE 3), we may note that the voltage rises from a negative value to zero at a point 56 which corresponds to a point 57 on the curve $\overline{B}_0$ at which time the inverse input voltage $\overline{B}_0$ drops to a negative value representative of 1. During the interval of the negative excursion of the wave $\overline{B}_0$ subsequent to the point 57, a further negative voltage from the wave 5 becomes impressed upon another input terminal of the gate-inverter circuit 17 at an interval commencing with a point 58. During the interval of negative excursion of the wave 5 subsequent to the point 58, another negative voltage from the wave 6 commencing at a point 59 becomes impressed upon the gate-inverter 17. During the interval of negative excursion of the wave 6 subsequent to the point 59, a still further negative voltage from the wave 7 commences at point 60. During the interval of negative excursion of the wave 7 subsequent to the point 60, a further negative voltage from the wave $\overline{B}_0$ commencing at a point 61 is impressed upon the gate-inverter circuit 17. At a time 62, the negative excursion of the wave $\overline{B}_0$ is terminated, and no further negative voltages are applied to any of the input terminals of the gate-inverter circuit 17; and therefore, the output wave 2 from the gate-inverter circuit 17 becomes negative at the point 63 corresponding in time with the point 62. Thus, it may be appreciated that a negative input signal will be applied to at least one of the input terminals of the gate 17 continuously during the whole interval from the point 56 of the wave 2 and the point 57 of the wave $\overline{B}_0$ until a point 62 of the wave $\overline{B}_0$ which corresponds to the point 63 of the wave 2. The logical operation of each of the others of the gate-inverter circuits 16 through 23 may be seen to be similar to that of the gate-inverter circuit 17 and its output wave 2.

While the gate-inverter circuits 16 through 23 constitute the sequential quasi ring arrangement for generating overlapping output voltages, and essentially provide the counting function for the counting stage, the two further gate-inverter circuits 24 and 25 provide an output means for decoding the signals 1 through 8 and for generating quadrature square wave output signals $A_1$ and $B_1$ similar to the input signals $A_0$ and $B_0$, but half of the frequency thereof. The output waves $A_1$ and $B_1$ may be expressed in Boolean algebra by the equations:

(9) $\qquad A_1 = \overline{5 + 6 + 7}$
(10) $\qquad B_1 = \overline{3 + 4 + 5}$ It may be noted from these equations that three sequential overlapping signals of the gate-inverter circuits 16 through 23 are used to develop the output waves $A_1$ and $B_1$. Again it is interesting to note that during any particular interval of zero voltage output from the waves $A_1$ or $B_1$, that at least one of the input terminals of the respective gate-inverter circuit 24 or 25 receives a negative input voltage from at least one of three sequential overlapping output waves.

From the above, it may be appreciated that the gate-inverter circuits 24 and 25 generate the output signals $A_1$ and $B_1$ from particular combinations of signals generated by the quasi ring arrangement including the gate-inverter circuits 16 through 23. If it is desired to generate the inverse signals $\overline{A}_1$ and $\overline{B}_1$, inverter circuits may be coupled to the output signals $A_1$ and $B_1$, or alternatively, two further gate-inverter circuits (not shown) may receive additional combinations of the signals 1 through 8 generated by the circuits 16 through 23 to provide the inverse output signals $\overline{A}_1$ and $\overline{B}_1$. Thus, the output signal $\overline{A}_1$ may be generated by a gate-inverter having three input terminals respectively coupled to the leads 1, 2 and 3 from the circuits 16, 17 and 18. The Boolean equation defining this operation would be:

(11) $\qquad \overline{A}_1 = \overline{1 + 2 + 3}$

Similarly, the $\overline{B}_1$ output signal may be generated by another gate-inverter circuit having input terminals coupled to the leads 7, 8 and 1 from the gate-inverter circuits 22, 23 and 16, and operating according to the Boolean equation:

(12) $\qquad \overline{B}_1 = \overline{7 + 8 + 1}$

As indicated by the diagram of FIGURE 3, both the input waves and the output waves of any counting stage 11, 12 or 13 are similar phase quadrature square waves. The outputs from each of the terminals $A_0$, $A_1$, $A_2$ etc. will provide a natural binary counting signal. A further high frequency signal $A_{00}$ may be obtained by the use of three gate-inverter circuits 65, 66 and 67, FIGURE 1. These three gate-inverter circuits essentially constitute an "exclusive OR" circuit which produces a negative output voltage corresponding to a binary "one" during times when a voltage is applied to one of the input terminals $A_0$ or $B_0$ but not to both input terminals. The logic function switching circuit may be appreciated from the Boolean equation:

(13) $\quad A_{00} = \overline{\overline{(A_0 + B_0)} + \overline{(\overline{A_0} + \overline{B_0})}} = A_0 B_0 + \overline{A_0}\overline{B_0}$ If the shaft 28 and commutator 27 is in a position as shown, a negative voltage (binary one) will appear on the lead $A_0$ and a zero voltage (binary zero) will appear on the lead $B_0$. Since a negative voltage appears on at least one of the input terminals to the gate-inverter circuit 65, the output therefrom will be a zero. On the other hand, the voltages passed by the inverter circuits 14 and 15 will be such that a negative voltage will appear as $\overline{B}_0$ and be applied to the gate-inverter circuit 66 whereby the output signal from this circuit will also be zero. Since the output signals from both the gate-inverter circuits 65 and 66 are zero, the gate-inverter circuit 67 will generate a negative output voltage or binary one. On the other hand, if the commutator position is such that the input signals $A_0$ and $B_0$ are both zero, the output signal from the gate-inverter circuit 65 will be a one, and therefore, the output signal from the gate-inverter circuit 67 will be a zero. Similarly, if the commutator position is such that both the signals $A_0$ and $B_0$ are in a negative state, the inverter circuits 14 and 15 will produce inverted signals $\overline{A}_0$ and $\overline{B}_0$ which are zero whereupon the gate-inverter circuit 66 will generate a negative signal corresponding to a binary one, and the gate-inverter circuit 67 will produce a zero output. The signal $A_{00}$ as shown in FIGURE 3 will be a double frequency square wave signal derived from input signals $A_0$ and $B_0$. The signal $A_{00}$ is the least significant binary digit of the natural binary output terminal 53 shown by FIGURE 1 wherein the other digits in order of ascending significance will be $A_0$, $A_1$, $A_2$, etc.

As shown in FIGURE 3, a vertical line 65 indicates an initial or reset condition of the counter. To begin any measurement the counter may be reset to this condition by the reset means 51. At the reset condition, the gate-inverter circuits 16 through 23 are generally in the off or zero state, and only the gates 16, 17 or 23 may be in a state of conduction to provide a negative voltage (binary one) in the signals 1, 2 and 8. As shown in FIGURE 4, the push-button reset switch 51 when operated will temporarily break the emitter circuit of the transistor 34, and will cause the gate-inverter circuits 16, 17 and 23 (FIGURE 4) to assume the negative voltage output or binary one state. As shown in FIGURE 1, the push-button reset means may be common to all of the counting stages, and will therefore, reset all of the stages to the condition shown by the line 65 of FIGURE 3. Obviously, the $B_0$ input signal may be either of negative input potential or ground potential depending upon the commutator or other input positioning, and when the reset button 51 is released to again ground the corresponding emitter circuits (FIGURE 4 either the circuit 17 or the circuit 23 will immediately revert to the zero output condition depending upon the condition of the input wave $B_0$.

Although FIGURE 3 has been referred to as a timing chart or timing diagram it must be appreciated that the reference time as shown by the abscissa is related merely to the input signals $A_0$, $B_0$ and the commutator 27 or other input means. If the commutator 27 rotates clockwise, the input waves $A_0$ and $B_0$ will be as shown with time increasing from left to right. However, if the commutator 27 or other input means were to stop dead at any particular point, the progression of all of the waves of FIGURE 3 would likewise stop dead, and the counter would remain in a static condition. If the commutator 27 were to rotate backwardly or counter-clockwise, the quadrature waves $A_0$ and $B_0$ would be generated in opposite phase such that the wave $B_0$ would lead the wave $A_0$. In this event, the entire sequence of the diagram of FIGURE 3 would move from right to left, and the counter would count down rather than up. Regardless of the direction of movement of the commutator 27 or the other input means, the counter of this invention will respond with the gate-inverter circuits shifting in sequence from one state to another without intervals of uncertainty, since each NOR circuit must respond to a plurality of waves which overlap each other.

An important feature of this invention resides in the fact that subsequent counting stages receive input signals of lower frequencies. Therefore, a high frequency and precise counter may be built by using components having the necessary high frequency response characteristic in the first stage for developing the least significant binary bit. The subsequent stages receive input waves of reduced frequency, and therefore, the subsequent stages may be constructed of less expensive components having lower frequency response characteristics without impairing the overall high frequency response of the counter.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A reversible counting circuit for counting input signals having a plurality of waves which are different in phase with respect to each other, said counter comprising a plurality of gate-inverter circuits each having a plurality of input terminals and an output terminal, one of the input terminals of each of the gate-inverter circuits being coupled to receive one of the waves of the input signals and the other input terminals being coupled to the output terminals of other gate-inverter circuits, said gate-inverter circuits being operable to pass output voltage levels therefrom in sequence with respect to adjacent gate-inverter circuits.

2. A reversible counting circuit for counting input signals having two waves which are out of phase with respect to each other, said counter comprising a plurality of gate-inverter circuits each having a plurality of input terminals and an output terminal, one of the input terminals of each of the gate-inverter circuits being coupled to receive one of the waves of the input signals and the other input terminal being coupled to the output terminals of other gate-inverter circuits, said gate-inverter circuits being sequentially arranged with respect to each other and being operable to pass voltage levels from the output terminals thereof in an overlapping sequence, each of the gate-inverter circuits being operable to pass an output voltage of a first state during the time when the next previous gate-inverter circuit was in the first conductive state.

3. A reversible counting circuit for counting input signals including two waves which are shifted in phase with respect to each other, said counter comprising an input means, and a plurality of gate-inverter circuits constituting a counting means, said input means including terminals for receiving and directly passing the two waves of the input signal and further including inverting means for passing waves which are the inverse of the input waves, each of the gate-inverter circuits of the counter means including a plurality of input terminals and an output terminal, one of the input terminals of each of the gate-inverter circuits of the counter means being coupled to the input means for receiving a square wave and the other input terminal being coupled to the output terminals of other gate-inverter circuits, each of the gate-inverter circuits being operable to pass an output voltage in an overlapping sequence with respect to the adjacent gate-inverter circuits.

4. A reversible counting circuit in accordance with claim 3 wherein each of the gate-inverter circuits comprises a NOR gate including a transistor having an emitter electrode, a base electrode and a collector electrode, each of the input terminals being coupled to bias the base electrode of the transistor, said emitter electrode being coupled to a reference potential, said collector electrode being coupled to the output terminal and operable to pass an inverse signal whenever a conditioning signal is received by any of the input terminals.

5. A reversible counting circuit in accordance with claim 4 comprising a reset means coupled between the emitter electrode of the transistor and the reference potential of selected ones of the NOR circuits, said reset means being operable to interrupt current flow to the emitter electrode of the transistor whereby the selected NOR circuits are driven into a conduction state corresponding to a binary 1.

6. A reversible counting circuit for counting input signals including two square waves which are shifted in phase with respect to each other, said counter comprising an input means, a plurality of gate-inverter circuits constituting a counting means, and a second plurality of gate-inverter circuits constituting an output means, said input means including terminals for receiving and directly passing the two square waves of the input signal and further including inverting means for passing square waves which are the inverse of the input waves, each of the gate-inverter circuits of the counting means including a plurality of input terminals and an output terminal, one of the input terminals of each of the gate-inverter circuits of the counter means being coupled to the input means for receiving a square wave and the other input terminal being coupled to the output terminals of other gate-inverter circuits, each of the gate-inverter circuits of the counting means being operable to pass an output voltage in an overlapping sequence with respect to the adjacent gate-inverter circuits, each of the gate-inverter circuits of the output means having a plurality of input terminals each coupled to an output terminal of the gate-inverter circuit of the sequencing means whereby the gate-inverter circuits of the output means are operable to establish square waves shifted in phase with respect to each other for providing an input to a counter of higher binary order.

7. A reversible counting circuit for counting input signals including two square waves which are in quadrature with respect to each other, said counter comprising an input means, a plurality of gate-inverter circuits constituting a counting means, and a second plurality of gate-inverter circuits constituting an output means, said input means including terminals for receiving and directly passing the two square waves of the input signal and further including inverting means for passing square waves which are the inverse of the input waves, each of the gate-inverter circuits of the counting means including four input terminals and one output terminal, one of the input terminals of each of the gate-inverter circuits of the counter means being coupled to the input means for receiving a square wave, the other input terminals of the gate-inverter circuits being coupled to the output terminals of other gate-inverter circuits, the gate-inverter circuits of the counting means being arranged in a ring and being operable to pass an output signal in overlapping sequence with respect to the adjacent gate-inverter circuits of the ring, the input terminals of each of the gate-inverter circuits of the counting means being coupled to the output terminal of the gate-inverter circuit which occupies the opposite position in the ring and to the output terminals of the two gate-inverter circuits which are positioned adjacent to the opposite circuit, each of the gate-inverter circuits of the output means having a plurality of input terminals each coupled to an output terminal of the gate-inverter circuit of the sequencing means whereby the gate-inverter circuits of the output means are operable to establish square waves shifted in phase with respect to each other for providing an input to a counter of higher binary order.

8. A reversible counter comprising, first and second sources of phase-related pulse signals; a plurality of gate-inverter circuits; circuit means coupling said first and second sources individually to selected ones of said gate-inverter circuits, said selected ones of gate-inverter circuits being arranged in a quasi ring circuit wherein the output of each three adjacent gate-inverter circuits is connected to the input of yet another one of said selected ones of said gate-inverter circuits; said selected ones of said gate-inverter circuits being sequentially energized in response to the phase difference between the pulses provided by said first and second sources.

9. The counter of claim 8, including a further pair of gate-inverter circuits; means connecting said further pair of gate-inverter circuits each to a first and a second sequence of three adjacent ones of said plurality of gate-inverter circuits, said first and second sequence including only one of said gate inverter circuits in common, and said pair of gate-inverter circuits providing a series of pulses whose phase difference is equal to the phase difference between and whose frequency is equal to one-half the frequency of the pulses provided by said first and second sources.

References Cited in the file of this patent

IBM Technical Disclosure Bulletin, vol. 3, No. 9, February 1961, pages 21 and 22.